E. ALLEN, dec'd.

S. GLOVER & B. L. BUDD, Assignees of SARAH E. ALLEN, Exr'x.

METALLIC CARTRIDGES.

No. 7,647. Reissued May 1, 1877.

*Witnesses:*

T. C. Brecht

Thomas C. Connolly.

Ethan Allen *Inventor:*

By Sam'l Glover } Assignees

Benj. L. Budd

UNITED STATES PATENT OFFICE.

SAMUEL GLOVER AND BERN L. BUDD, OF FAIRFIELD, CONN., ASSIGNEES OF SARAH E. ALLEN, EXECUTRIX OF ETHAN ALLEN, DECEASED.

IMPROVEMENT IN METALLIC CARTRIDGES.

Specification forming part of Letters Patent No. 47,688, dated May 16, 1865; reissue No. 7,647, dated May 1, 1877; application filed April 23, 1877.

*To all whom it may concern:*

Be it known that ETHAN ALLEN, of the city and county of Worcester, and State of Massachusetts, did invent certain new and useful Improvements in Metallic Cartridge-Shells; and we do hereby declare that the following is a full, clear, and exact description of the same, reference being had to the accompanying drawings, in which—

Figure 1:
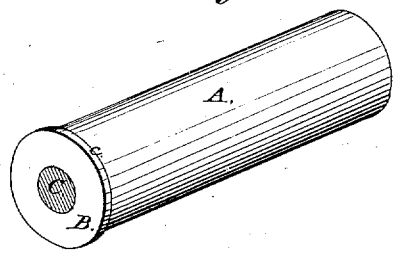
Figure 2:
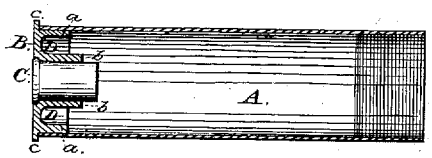
Figure 3:
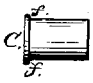
Figure 4:
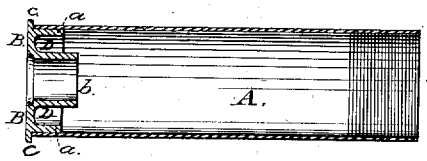

Figure 1 represents a perspective view of the improved metallic shell. Fig. 2 represents a longitudinal section of the shell; and Fig. 3 represents a side view of the cap used to explode the charge. Fig. 4 is a longitudinal sectional view of the cartridge-shell without the cap.

To enable those skilled in the art to which the invention belongs to make, construct, and use the same, we will proceed to describe the said improved metallic shell.

In the drawings, A represents the front part of the shell, which may be made of brass or other suitable metal. The front inner surface of the part A is provided with a series of close parallel grooves, *e*, for a purpose hereafter to be described.

In lieu of parallel grooves, a screw-thread may be used, or the surface roughened in any proper and suitable manner.

B is the base of the shell, made of steel or any other proper metal. It has an outer flange, *a*, to receive and extend a short distance up the side of the case part A, as fully indicated in the drawings, thus thickening and strengthening the lower portion of said case part where the greatest strain comes in firing.

The parts A and B are made to fit closely, and, after being placed in position, are brazed or otherwise securely united together.

The base B is provided with an inner flange or short powder-tube, *b*, into which the cap C is placed, as indicated in the drawings. The space between the flange or short tube *b* and outer flange *a* is of concave form, as indicated at D D. The base B is provided with a further flange, *c*, similar to what is used in the common metallic-shell cartridge, and which fits into a groove or recess at the rear of the barrel. The rear of the base B is concaved or grooved out, so that when the cap C is inserted its flange will rest against a shoulder or ledge on the base B, said shoulder forming an anvil, and the rear of the cap and the rear of the base being flush, all as clearly indicated in the drawings.

To load the shell, the cap is inserted in the rear of the base. The proper charge of powder is then put into the case A, and covered with a wad; then the shot or ball inserted, and a wad on top of that, the last-named wad occupying a position so as to be in contact with the grooved or roughened surface of the case A. The loaded shell is then placed in the rear of the barrel in the ordinary manner. The charge is fired by exploding the cap C, which is effected by forcing a rod or piston against the rear of the cap, thereby exploding the fulminating-powder contained in the flange *f* of the cap C, as indicated in Fig. 3. As the flange of the cap rests firmly against the groove or shoulder in the rear of the base B, it is always sure to be exploded by the blow of the hammer against the rod or piston. After the charge has been fired the shell is withdrawn, and the cap removed or pushed out, which can be easily effected by the use of a small punch or pin, which is to be inserted into the cap from the front of the case A. The shell is again to be loaded and fired, and the operation repeated, the shell remaining comparatively uninjured.

As heretofore used, the charge contained in metallic cartridge-shells has been liable to start forward by any sudden jarring occasioned by the discharge of one barrel of the loaded gun, or otherwise; but all such danger and liability is obviated by the grooved or roughened surface *e* of the shell, since the least force tending to start the charge forward will cause the wad to bind in the case, it being held by the grooved or roughened surface *e*, the projecting portions left by the grooves or roughening being just sufficient to bite into the edge of the wad, but in no wise offering an obstacle to the shot. Then, again, as respects the firing or burning of the powder, it is attained in this shell in a most perfect manner, since the fire is first communicated to the powder near the shot or ball, and burns back.

Still another advantage resulting from the peculiar construction of this improved cartridge-shell consists in starting the ball by the ignition of a small quantity of powder that is contained in the cap, and the encircling powder-tube thus lessening the danger of explosions.

In case caps are used which are a little loose, by placing the shell, after the cap has been inserted, upon some firm substance, the cap can be tightened by means of a convex plunger inserted into the mouth of the cap, whereby the edges of the cap are forced out against, and, if necessary, a little over, the flange *b*. The explosion of the powder in the cap C causes the case of the cap to expand against the flange or tube *b*, thereby preventing all escape of gas.

Having thus described the improved metallic cartridge-shell, we claim as the invention of the said ETHAN ALLEN, and desire to secure by Letters Patent—

1. A cartridge-shell the base of which is provided with an opening to receive a cap, and with a powder-tube extending inwardly from the anvil toward the center of the explosive charge, whereby the fire is first communicated to the powder in the tube, and is then radiated from the center of the charge, substantially as described.

2. A cartridge-shell having a grooved or roughened inner surface, adapted to bite into the edges of and hold the wad against chance displacement, substantially as described.

3. In a cartridge-shell, the base B, grooved to form an anvil for the cap, and having powder-tube *b* prolonged toward the interior of the explosive charge, substantially as described.

4. A cartridge-shell composed of the cylindrical case A and the base B, provided with three flanges, *a*, *b*, and *c*, substantially as described.

SAML. GLOVER.
BERN L. BUDD.

Witnesses:
T. C. BRECHT,
THOMAS C. CONNOLLY.